(12) United States Patent
Stavermann

(10) Patent No.: US 6,189,918 B1
(45) Date of Patent: Feb. 20, 2001

(54) INFLATABLE HEAD PROTECTION SYSTEM FOR THE LATERAL AREA OF A PASSENGER CAR

(75) Inventor: Joerg Stavermann, Munich (DE)

(73) Assignee: Bayerische Motoren Werke Aktiengesellschaft, Munich (DE)

(*) Notice: Under 35 U.S.C. 154(b), the term of this patent shall be extended for 0 days.

(21) Appl. No.: 09/161,470

(22) Filed: Sep. 28, 1998

Related U.S. Application Data

(63) Continuation of application No. PCT/EP97/00574, filed on Feb. 10, 1997.

(30) Foreign Application Priority Data

Mar. 27, 1996 (DE) ............................................. 196 12 228

(51) Int. Cl.⁷ .................................................. B60R 21/22
(52) U.S. Cl. ........................................................ 280/730.2
(58) Field of Search ........................... 280/730.2, 730.1, 280/728.2, 728.3, 743.2, 743.1

(56) References Cited

U.S. PATENT DOCUMENTS

| | | | |
|---|---|---|---|
| 2,834,606 | 5/1958 | Bertrand | 280/150 |
| 4,948,168 | 8/1990 | Adomeit et al. | 280/732 |
| 4,966,388 | 10/1990 | Warner et al. | 280/730 |
| 5,163,730 | 11/1992 | Welch | 296/189 |
| 5,322,322 | 6/1994 | Bark et al. | 280/730 |
| 5,324,074 | 6/1994 | Christian et al. | 280/728 R |
| 5,439,247 * | 8/1995 | Kolb | 280/730.2 |
| 5,480,181 | 1/1996 | Bark et al. | 280/730.2 |
| 5,503,427 | 4/1996 | Ravenberg et al. | 280/728.3 |
| 5,540,459 | 7/1996 | Daniel | 280/730.2 |
| 5,544,913 | 8/1996 | Yamanishi et al. | 280/730.2 |
| 5,651,582 | 7/1997 | Nakano | 297/216 |
| 5,788,270 * | 8/1998 | Haland et al. | 280/729 |
| 5,791,683 * | 8/1998 | Shibata et al. | 280/730.2 |
| 5,884,937 * | 3/1999 | Yamada | 280/730.2 |
| 5,899,491 * | 5/1999 | Tschaeschke | 280/730.2 |
| 5,924,723 * | 7/1999 | Brantman et al. | 280/730.2 |
| 5,957,487 * | 9/1999 | Stutz | 280/730.2 |

FOREIGN PATENT DOCUMENTS

| | | |
|---|---|---|
| 34 22 263 | 12/1985 | (DE) . |
| 41 37 691 | 11/1992 | (DE) . |
| 42 38 427 | 5/1993 | (DE) . |
| 43 04 919 | 9/1993 | (DE) . |
| 43 07 175 | 9/1993 | (DE) . |
| 43 08 693 | 9/1993 | (DE) . |
| 42 32 658 | 3/1994 | (DE) . |
| 43 35 073 | 4/1994 | (DE) . |
| 195 19 297 | 12/1995 | (DE) . |
| 44 26 848 | 2/1996 | (DE) . |
| 295 19 540 U | 4/1996 | (DE) . |
| 296 03 316 U | 8/1996 | (DE) . |
| 296 05 897 | 9/1996 | (DE) . |
| 296 10 920 | 10/1996 | (DE) . |
| 0 694 444 | 1/1996 | (EP) . |
| 0 705 738 | 4/1996 | (EP) . |
| 2 238 343 | 2/1975 | (FR) . |
| 2 345 316 | 10/1977 | (FR) . |

(List continued on next page.)

Primary Examiner—Brian L. Johnson
Assistant Examiner—Tony Winner
(74) Attorney, Agent, or Firm—Evenson, McKeown, Edwards & Lenahan, P.L.L.C.

(57) ABSTRACT

An air bag is provided which extends from the front seats to the rear seats of a passenger car, is constructed in the manner of a cushion and is fastened to the roof member as well as to at least one fastening point respectively of the A-column and of the C-column of the vehicle body. In order to be able to arrange the air bag in a non-inflated condition along the roof member, the air bag is folded essentially along a connection line of the two fastening points on the vehicle body columns, and at least two recesses cut by the connection line are provided in the cushion surface of the air bag.

14 Claims, 2 Drawing Sheets

FOREIGN PATENT DOCUMENTS

| | | |
|---|---|---|
| 2 191 450 | 12/1987 | (GB). |
| 2 261 636 | 5/1993 | (GB). |
| 2 278 812 | 12/1994 | (GB). |
| 07117605 | 5/1995 | (JP). |
| 08310335 | 11/1996 | (JP). |
| WO 94/19215 | 9/1994 | (WO). |

* cited by examiner

INFLATABLE HEAD PROTECTION SYSTEM FOR THE LATERAL AREA OF A PASSENGER CAR

CROSS-REFERENCE TO RELATED APPLICATIONS

This application is a continuation under 35 U.S.C. 111(a) of pending international PCT Application No. PCT/EP97/00574, filed Feb. 10, 1997, and claims the priority of German application number 196 12 228.7, filed on Mar. 27, 1996, the disclosures of which are incorporated by reference herein.

This application is related to application Ser. No. 09/161,222 filed on Sep. 28, 1998 in the name of Andreas FALLMANN and Joerg STAVERMANN for ARRANGEMENT OF AN INFLATABLE HEAD-PROTECTION SYSTEM IN A MOTOR VEHICLE and application Ser. No. 09/161,470 filed on Sep. 28, 1998 in the name of Joerg STAVERMANN for ARRANGEMENT OF AN INFLATABLE LATERAL HEAD PROTECTION SYSTEM IN A MOTOR VEHICLE.

BACKGROUND AND SUMMARY OF THE INVENTION

The invention relates to an inflatable head protection system for the lateral area of a passenger car having front seats and rear seats, having an air bag which is linked to the vehicle body and, in the non-inflated condition, is arranged in a folded manner along a vehicle body frame part. Concerning the known prior art, reference is made only in the manner of examples to International Patent Document WO 94/19215 and to German Patent Document DE 42 31 522 A1.

The prior art includes head protection systems which are connected either with a thorax air bag module or a thorax air bag and which inflate from the vehicle door or the vehicle seat. In those systems, the air bag size is designed such that the thorax area as well as the head can be protected. The prior art also includes separate head protection systems which are arranged, for example, in the roof area of the vehicle. In the case of separate head protection systems a differentiation can be made between cushion-type air bags, which are fastened as a compact unit close to the occupants at the roof, and hose-shaped air bags which are fastened to the A-column and to the C-column of the vehicle body and, by means of a contraction, are brought into the protective position during the inflating operation (compare International Patent Document WO 94/19215).

Neither head protection systems which are connected with the thorax air bag module, nor separate cushion-type systems which are arranged in the vehicle roof are capable of absorbing side forces which act upon them when the head laterally impacts on them. A strong swinging of the head during a side collision, particularly with low collision opponents which offer no supporting surface to the inflated air bag, can therefore not be prevented by these known systems. Although, the system which is illustrated in International Patent Document WO 94/19215 is capable of absorbing side forces, because of its special method of operation, it requires complicated manufacturing processes, can be produced only as a hose-shaped structure with a round cross-section and can be arranged in the vehicle only in a defined position. In addition, this system is designed only for the front passengers of the passenger car sitting in the front seats.

It is therefore an object of the invention to provide an air bag configuration which utilizes the advantages of the known systems and simultaneously opens up greater design possibilities with respect to the layout of the protection area and the housing of the air bag.

This and other objects have been achieved according to the present invention by providing an inflatable head protection system for a side area of a passenger vehicle having a front seat and a rear seat, comprising: an air bag coupled to a vehicle body, said air bag being arranged in a folded manner along a vehicle body frame part in a non-inflated condition, said air bag extending at least from an area adjacent said front seat to an area adjacent said rear seat, said air bag being fastened to said frame part, to at least a first fastening point on a vehicle body A-column and to at least a second fastening point on a vehicle body C-column, said air bag being folded essentially along a connection line defined by said first and second fastening points, said air bag defining at least two recesses in a surface thereof, said recesses being intersected by said connection line.

This and other objects have also been achieved according to the present invention by providing an air bag for an inflatable head protection system for a side area of a passenger vehicle having a front seat and a rear seat, said air bag comprising: a first portion to be coupled to an A-column of the vehicle; a second portion to be coupled to a roof member of the vehicle proximate said front seat; and a third portion to be coupled to a C-column of the vehicle, a first opening being defined between said first and second portions, and a second opening being defined between said second and third portions.

The cushion-type air bag, which extends from the front seats to the rear seats of the passenger car, is fastened to the frame part and at least one fastening point respectively of the A-column and of the C-column of the vehicle body, that furthermore the air bag is folded essentially along a connection line of these two fastening points, and in that at least two recesses cut by the connection line are provided in the cushion surface of the air bag.

According to the invention, the air bag extends along a relatively large lateral area of the interior of the passenger car; that is, in the inflated condition, the air bag protects the vehicle occupants in the front seats as well as those in the rear seats. In order to, in the process, ensure an optimal protection of the head not only in the event of a side collision of the passenger car but also in the event of its rollover, this air bag is constructed in the manner of a cushion, and not only in the shape of a hose, in which case at least partial areas of the thorax can also be supported and therefore be protected. The head protection system according to the invention simultaneously has a relatively high lateral stiffness, since the air bag is fastened not only to the frame part of the vehicle body, normally, this is the roof member or the roof area of the side frame, but has additional fastening points on the A-column as well as on the C-column of the vehicle body. In the event of a lateral impact of the head, the air bag can therefore not escape to the side so that the vehicle occupant's head will be securely supported. In this case, the fastening points on the A-column and the C-column may be as far removed from the frame part as possible; that is, when the air bag is fastened to the roof member as the frame part, these fastening points on the A-column as well as on the C-column should be situated as far down as possible.

However, since now the individual fastening points of the cushion-type air bag are spaced relatively far away from one another, in order to be able to brace this air bag for the optimal absorption of side force virtually along the whole upper side area of the vehicle interior, problems may occur with the housing of the air bag in the non-inflated condition along the vehicle body frame part, specifically along the roof member or the door railing. In order to ensure that, despite these widely spaced fastening points, the air bag can still be folded, the folding takes place essentially along a connection line of the two fastening points on the A-column and the C-column, and that at least two recesses, or openings, which are cut by the connection line, are provided in the cushion surface of the air bag. After a first folding about the mentioned connection line, because of the recesses, virtually three air bag segments will be obtained which are each separately folded further and can then also in a simple manner be housed on the vehicle body frame part.

Other objects, advantages and novel features of the present invention will become apparent from the following detailed description of the invention when considered in conjunction with the accompanying drawings.

DETAILED DESCRIPTION OF THE DRAWINGS

Figure 1:
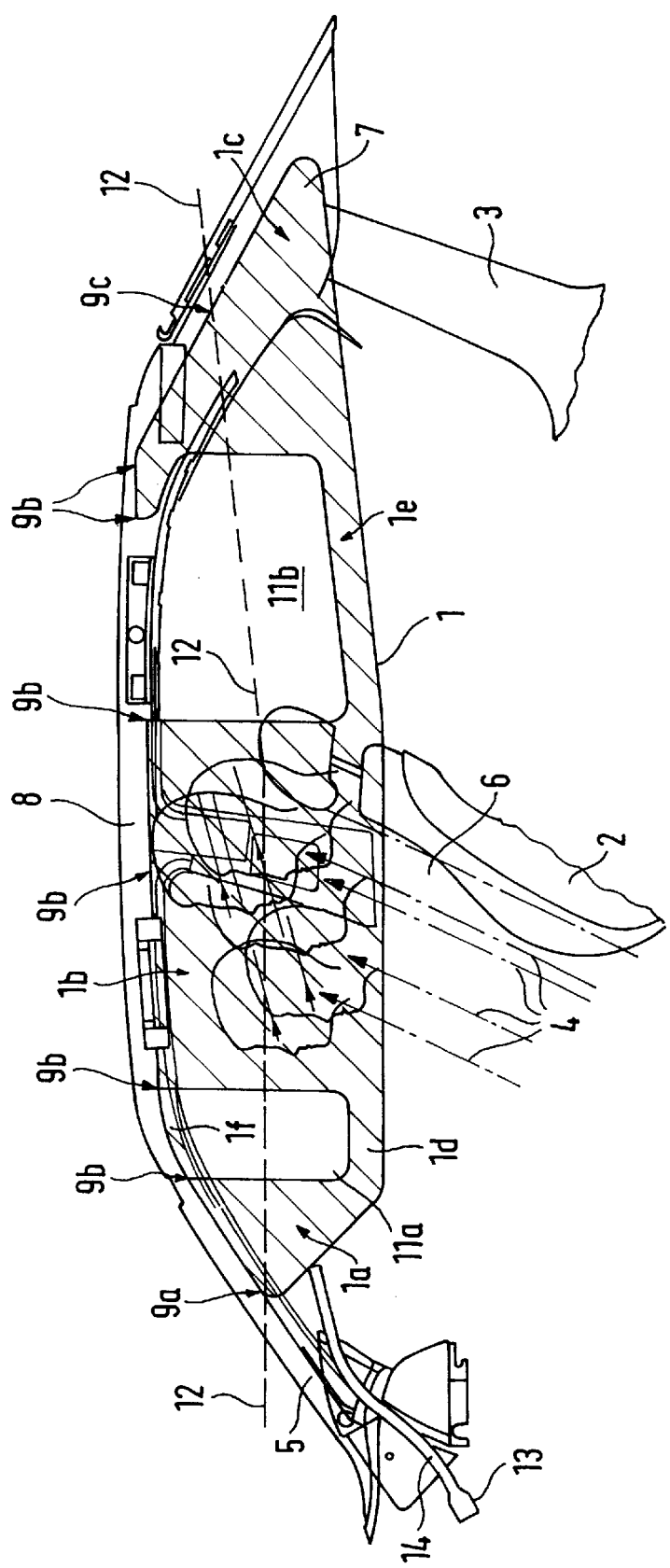
FIG. 1 is a view of the lateral area of a passenger car interior with an inflated head protection system according to a preferred embodiment of the present invention.
Figure 2:
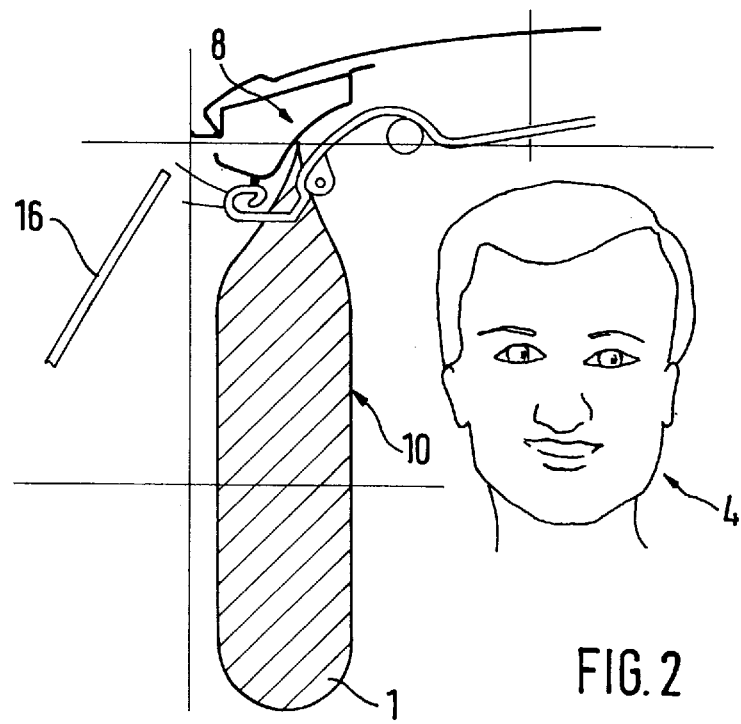
FIGS. 2, 3, are virtual sectional views of FIG. 1, that is, partial longitudinal views of the passenger car interior.
Figure 3:
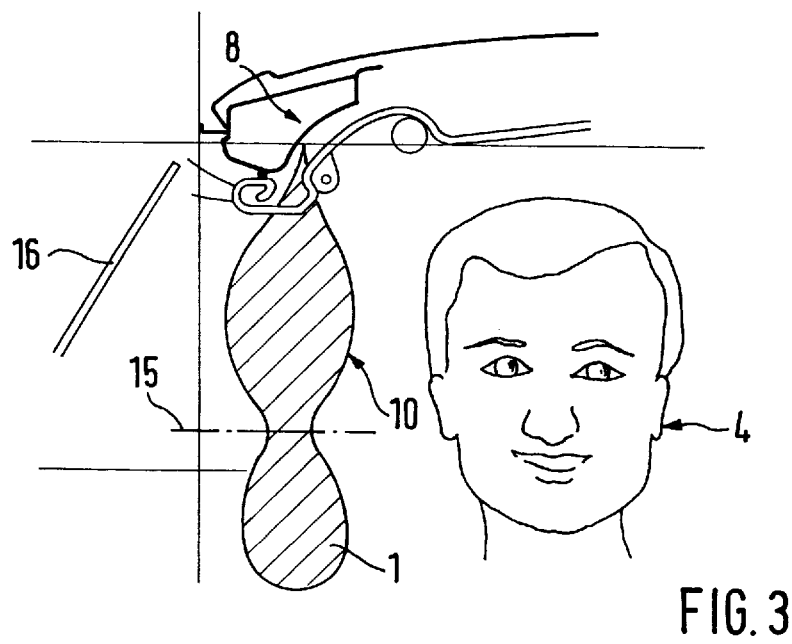

Referring to FIGS. 1–3, an air bag 1 is shown in the inflated condition and is used as a head protection system for the side area of a passenger car. In this case, the air bag 1 protects the head of a vehicle occupant who is seated in the front seat 2 of the passenger car as well as the head of a vehicle occupant who is seated in the rear seat 3. Various possible head positions of a vehicle occupant in the front seat 2 have the reference number 4.

As customary, the passenger car has an A-column 5, a B-column 6 as well as a C-column 7 and, in addition, a roof member 8 which in the following will be called a vehicle body frame part 8. The air bag 1 is fastened to this roof member 8 at various fastening points 9b and, in the non-inflated condition, is arranged in a folded manner along this roof member 8.

In addition, the air bag 1 is fastened to the A-column 5 at a fastening point 9a and to the C-column 7 at a fastening point 9c in order to ensure in the inflated condition that this air bag 1 can absorb side forces which result from an impact of the head 4 and thus, in FIG. 1, act essentially perpendicularly to the plane of the drawing and, in FIGS. 2, 3, act according to the direction of the arrow 10 in the direction of the passenger car side window 16. In the inflated condition, the air bag 1 is essentially braced with respect to the full surface. However, without additional measures, it would not be possible to fold the air bag 1 and to house it in a non-inflated condition essentially along the frame part or the roof member 8. Two openings or recesses 11a, 11b are therefore provided in the so-called cushion surface, that is, in the surface of the air bag 1 illustrated in FIG. 1, which recesses 11a, 11b are cut by an imaginary connection line 12. This imaginary connection line 12 connects the two fastening points 9a, 9c essentially in a straight line or with the inclusion of a small angle. It is clearly demonstrated that, starting from the illustrated condition, the air bag 1 can first be folded about this connection line 12; that is, the area of the air bag 1 situated below this connection line 12 can be folded upward toward the roof member 8. Because of the two recesses 11a, 11b, it will then be possible to further fold the partial area 1a of the air bag 1 situated in front of the front recess 11a with respect to the passenger car toward the upper section of the A-column, while the partial area 1c of the air bag situated behind the rearward recess 11b with respect to the passenger car can be folded further essentially toward the upper section of the C column 7. The partial area 1b of the air bag 1 situated between the two recesses 11a, 11b can then be folded further in the direction of the roof member 8. By means of the described folding strategy as well as by means of the recesses 11a, 11b, it is therefore possible to house an air bag 1, which is optimally braced in the inflated condition and extends from an area adjacent the front seats 2 to an area adjacent the rear seats 3, in a folded manner essentially in the area of the roof member 8 as well as in the upper end sections of the A-column 5 and of the C-column 7 which, in this sense, also form vehicle body frame parts 8.

On their sides facing away from the frame part 8 (i.e., lower side), the recesses 11a, 11b do not extend to the edge of the air bag 1, which means that, in the lower air bag area, between the partial areas 1a and 1b, an also inflatable connection web 1d is provided and, between the partial areas 1b and 1c, also in the downward area, an inflatable connection web 1e is provided. In the same manner, the recess 11a extends on its side facing the frame part 8 also not to the edge of the air bag 1 so that here again an inflatable connection web 1f is situated. In the illustrated embodiment, the rear recess 11b extends on the top side to the edge of the air bag 1 but, as an alternative, a construction is also contemplated in the case of which a connection web is also provided between the partial areas 1b and 1c in the area of the roof member 8.

In addition to the fact that these connection webs provide an increased lateral stiffness to the inflated air bag 1, it is a function of these connection webs 1d, 1e, 1f that the inflating of the individual partial air bag areas 1a, 1b, 1c can also take place via a single gas generator 13. This gas generator 13, which is connected with the air bag 1 via an air pipe 14, may, for example, be arranged in the lower area of the A-column 5, preferably below the dashboard. However, alternatively or additionally, gas generators may be arranged in the area of the B-column 6 and/or of the C-column 7, in which case several gas generators 13 may also be provided.

As mentioned above, the head protection system achieves a certain lateral stiffness as the result of the special geometry of the air bag areas 1a, 1b, 1c as well as on the basis of the connection webs 1d, 1e in conjunction with the lower fastening points 9a and 9c and the main linkage to the roof member 8 at the fastening points 9b. This lateral stiffness can still be varied as a function of the internal air bag pressure and is particularly advantageous in order to avoid, in the case of low collision opponents in the lateral area of the passenger car, a strong side acceleration and thus a high swinging motion of the head 4. This head protection system achieves not only a restraining but also a longer-lasting protection of the head. In particular, it provides improved protection in the event of a vehicle rollover. For this reason, the air bag 1 has an essentially airtight construction. This means that no artificial air discharge openings are provided, as is customary in the case of steering wheel air bags. Furthermore, the fabric of the air bag should also be essentially airtight and not air-permeable, as is customary, for example, in the case of thorax air bags. The described head protection system can therefore operate by means of relatively high internal pressures for a time period of several seconds if the air bag 1 is made of a coated or impregnated fabric with sealed or glued seams or if the fabric, which at first is uncoated, is coated or impregnated after the completion of construction of the air bag.

As the result of the cushion-type design of the air bag 1, a large, individually selectable or adjustable area of protection is obtained for the head 4 of a vehicle occupant seated in the front seats 2 as well as a vehicle occupant seated in the rear seats 3. In this case, different cross-sections in the cushion-type air bag 1 can also be implemented, as illustrated by a comparison of FIGS. 2 and 3. For example, the air bag 1 may be appropriately provided darts 15, as shown in FIG. 3. However, this detail and others may also be designed to deviate from the illustrated embodiment without leaving the content of the claims. An inflatable head protection system is achieved which has a very large area of protection, can optimally absorb side forces and furthermore offers an increased protection against glass splinters of the possibly broken side windows 16. In this case, the lower fastening points 9a, 9c of the head protection system required with a view to absorbing side forces are defined by the main folding axes required for the housing of the air bag 1 as well as by the vehicle geometry and air bag geometry, while the positions and numbers of the upper fastening points 9b are determined by the required system strength.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inflatable head protection system for a side area of a passenger vehicle having a front seat and a rear seat, comprising:
    an air bag coupled to a vehicle body, said air bag being arranged in a folded manner along a vehicle body frame part in a non-inflated condition,
    said air bag extending at least from an area adjacent said front seat to an area adjacent said rear seat,
    said air bag being fastened to said frame part, to at least a first fastening point on a vehicle body A-column and to at least a second fastening point on a vehicle body C-column,
    said air bag being folded essentially along a connection line defined by said first and second fastening points,
    said air bag defining at least two openings in a surface thereof, said recesses being intersected by said connection line.

2. A head protection system according to claim 1, wherein said air bag is a cushion-type air bag.

3. A head protection system according to claim 1, wherein sides of said recesses located opposite said frame part are spaced from a lower edge of said air bag opposite said frame part.

4. A head protection system according to claim 1, wherein one of said recesses is situated closer to a gas generator for filling the air bag, and wherein a side of said one of said recesses located adjacent said frame part is spaced from an upper edge of said air bag.

5. A head protection system according to claim 3, wherein one of said recesses is situated closer to a gas generator for filling the air bag, and wherein a side of said one of said recesses located adjacent said frame part is spaced from an upper edge of said air bag.

6. A head protection system according to claim 1, wherein said air bag has an essentially airtight construction.

7. A head protection system according to claim 1, wherein darts are provided to create different cross-sections in said air bag.

8. An air bag for an inflatable head protection system for a side area of a passenger vehicle having a front seat and a rear seat, said air bag comprising:
    a first portion to be coupled to an A-column of the vehicle;
    a second portion to be coupled to a roof member of the vehicle proximate said front seat; and
    a third portion to be coupled to a C-column of the vehicle,
    a first opening being defined between said first and second portions, and a second opening being defined between said second and third portions.

9. An air bag according to claim 8, wherein said air bag includes an inflatable connection web communicating lower ends of said first portion and said second portion.

10. An air bag according to claim 8, wherein said air bag includes an inflatable connection web communicating lower ends of said second portion and said third portion.

11. An air bag according to claim 9, wherein said air bag includes an inflatable connection web communicating lower ends of said second portion and said third portion.

12. An air bag according to claim 8, wherein said air bag includes an inflatable connection web communicating upper ends of said first portion and said second portion.

13. An air bag according to claim 9, wherein said air bag includes an inflatable connection web communicating upper ends of said first portion and said second portion.

14. An air bag according to claim 11, wherein said air bag includes an inflatable connection web communicating upper ends of said first portion and said second portion.

* * * * *